UNITED STATES PATENT OFFICE.

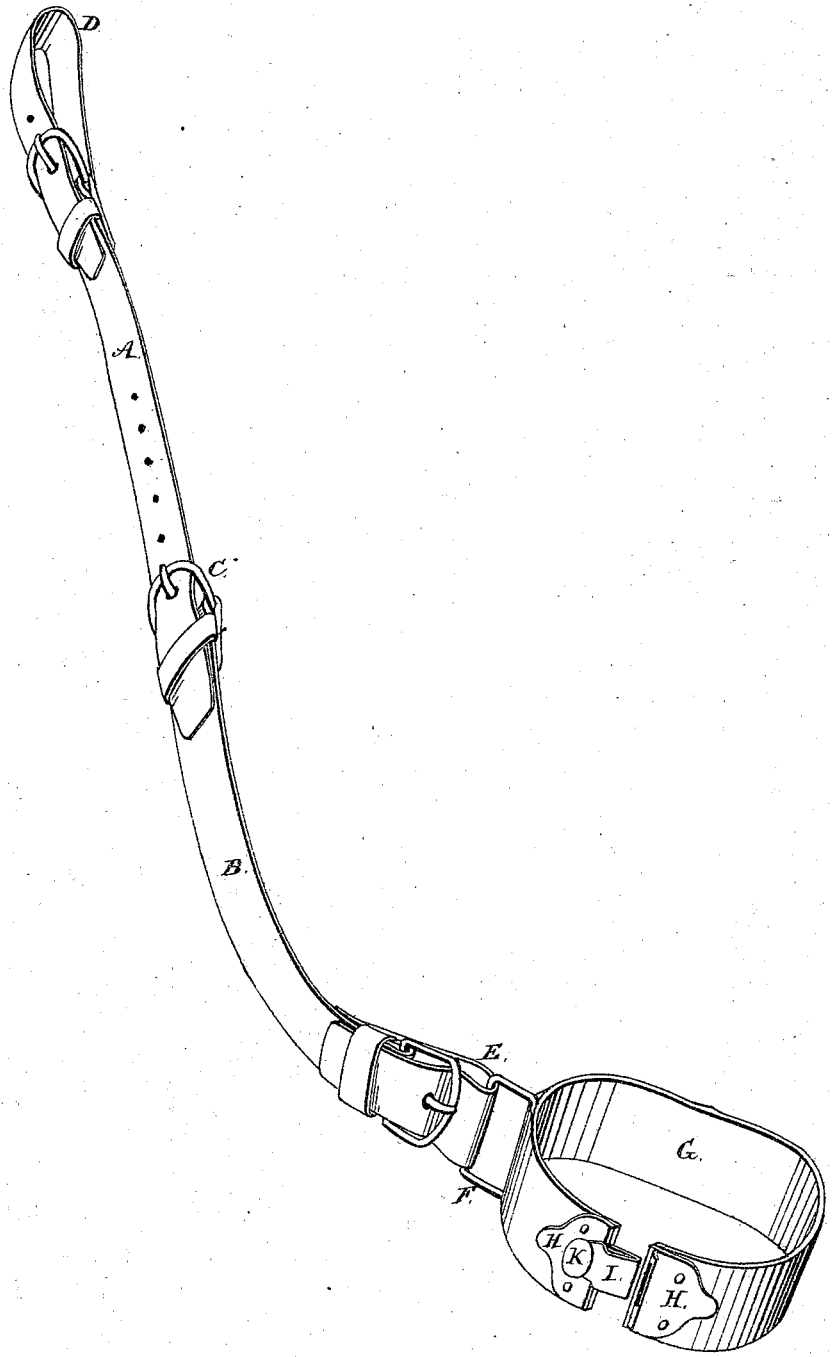

JOHN C. FORD, OF MONTREAL, CANADA, ASSIGNOR OF ONE-HALF HIS RIGHT TO AUSTIN D. CABLE.

IMPROVEMENT IN PASTERN-HALTERS FOR HITCHING HORSES.

Specification forming part of Letters Patent No. 144,198, dated November 4, 1873; application filed September 4, 1873.

*To all whom it may concern:*

Be it known that I, JOHN C. FORD, of Montreal, in the Kingdom of Canada, have invented a Pastern-Halter for Hitching or Fastening Horses; and I do hereby declare the following to be a full and correct description of the same, reference being had to the accompanying drawing, which is a perspective view of my invention.

My invention consists in a device to be used as a new method of fastening horses, designed to take the place of the contrivances at present in use for that purpose, such as the neck-halter, the bit-strap, the weight and strap, and other devices of that class for hitching horses by the head. It also renders unnecessary hitching-posts and racks, their places being supplied by the vehicle to which the horse is harnessed.

I denominate my invention a "pastern-halter," as it is intended to be applied to the pastern of the horse by means of a clasped ring attached to an adjustable halter-strap.

In the drawings, A and B mark parts of a halter-strap, made adjustable as to length by means of the buckle C. A loop, D, at one end of the halter, affords the means of attaching it to the thills or single-tree of the vehicle to which the horse is harnessed. The length of the strap is regulated to correspond with the distance from the point of attachment at D to the forefoot of the horse to be fastened. The opposite end of the halter-strap is provided with a buckled loop, E, by which it is attached to a metallic ring, F, projecting from a hopple-ring, G, of proper size to fit the pastern of the horse. This ring may be made of leather or metal, as preferred, and may be provided with a hinge to facilitate opening it. It should be carefully adapted to fit comfortably the part to which it is to be applied, and furnished with a spring-clasp controlled by a large thumb-button, so that it can be readily used by a gloved hand or in cold weather.

When this pastern-halter is in use, the end D is attached to the single-tree or thills of the vehicle, the ring G being hung to the D of the saddle, or on one of the terrets. When it is desired to hitch the horse, the ring G is applied to the pastern of the forefoot and clasped around it.

By this arrangement the horse is more effectually prevented from moving than by the ordinary methods of fastening.

I am aware that the elements of the invention are old, and I do not claim any of them separately; but I do claim, and desire to secure by Letters Patent—

As a new article of manufacture, a pastern-halter, to be applied as described, the same consisting of the combination of the ring G and halter A B, constructed in the manner specified, for the purpose set forth.

The above specification of my said invention signed and witnessed at Washington this 3d day of September, A. D. 1873.

JOHN C. FORD.

Witnesses:
W. P. BELL,
CHAS. F. STANSBURY.